June 4, 1968

C. D. JONES 3,386,548

SYNCHRONIZER CLUTCH MECHANISM WITH SPRING
TO RETURN BLOCKER TO NEUTRAL

Filed May 2, 1966

CLEVOE D. JONES
INVENTOR

BY *John R. Faulkner*
*Donald J. Harrington*
ATTORNEYS

June 4, 1968

C. D. JONES 3,386,548

SYNCHRONIZER CLUTCH MECHANISM WITH SPRING
TO RETURN BLOCKER TO NEUTRAL

Filed May 2, 1966

CLEVOE D. JONES
INVENTOR

BY John P. Faulkner
Donald J. Harrington
ATTORNEYS

June 4, 1968 C. D. JONES 3,386,548
SYNCHRONIZER CLUTCH MECHANISM WITH SPRING
TO RETURN BLOCKER TO NEUTRAL
Filed May 2, 1966 3 Sheets-Sheet 3

CLEVOE D. JONES
INVENTOR

3,386,548
SYNCHRONIZER CLUTCH MECHANISM WITH
SPRING TO RETURN BLOCKER TO NEUTRAL
Clevoe D. Jones, Franklin, Mich., assignor to Ford Motor
Company, Dearborn, Mich., a corporation of Delaware
Filed May 2, 1966, Ser. No. 546,858
5 Claims. (Cl. 192—53)

ABSTRACT OF THE DISCLOSURE

This specification describes a synchronizer clutch mechanism for use in a torque delivery gear system. The clutch mechanism includes engageable clutch parts having internal and external teeth. A blocker ring engages one clutch part as it is shifted toward engagement with the other clutch part. This causes a tangential friction force on the synchronizer ring which is transmitted to the other clutch part, thereby establishing synchronism in the motion of the clutch parts prior to completion of the clutching action. Spring means is included in the mechanism for rotating one clutch part with respect to the other to a neutral position in which the teeth of the clutch parts are aligned.

---

This invention relates to clutch mechanisms and more particularly to an improvement in a synchronizer clutch mechanism to provide smooth engagement of clutch elements that are part of a torque delivery path between a driving member and a driven member.

In a conventional, manually controlled, multispeed power transmission mechanism, for instance, a power input shaft is situated for rotation about an axis that is common to the axis of a power output shaft. A cluster gear assembly is mounted on a countershaft that is located in spaced and parallel relationship with respect to the power input and power output shafts. A power input gear is drivably connected to the power input shaft and is continuous engagement with one gear element of the cluster gear assembly. Other gears are mounted rotatably on the power output shaft and are in continuous meshing engagement with other gear elements of the cluster gear assembly.

Synchronizer clutches are employed for selectively clutching the power output shaft to the power input gear or to a forward underdrive gear to establish a torque delivery path from the power input shaft to the power output shaft at selected speed ratios.

A synchronizer clutch mechanism synchronizes the motion of the gears that are coaxially mounted for rotation about the axis of the power input and power output shafts prior to the engagement of positive clutching elements that establish a locking connection between these gears and the power output shaft.

In a known construction, the synchronizer clutch mechanism includes a resilient split synchronizer ring and a clutch carrier provided with a hub. Two stop members are disposed within the ring in diametrically opposed relationship with one stop member firmly fixed in the hub of the clutch carrier and the other stop member slidably mounted to be engageable by the synchronizing ring. Two resilient locking members are mounted in juxtaposition between the stop members.

When the slidable stop member is engaged by the synchronizing ring during shifting, one or the other locking band is spaced between the stop members depending on the peripheral direction of movement of the synchronizing ring. Although the servo action of the synchronizing ring is substantially increased due to the locking bands of this construction, it is quite possible that the servo components may remain partially in a braced or blocking position after synchronization is completed. When this occurs, the shift effort during a subsequent shift is increased. Even occasional blocking of the shift may occur.

Accordingly, one purpose of this invention is to overcome these disadvantages by providing a means for returning the servo components to their original position after synchronization is established. This is accomplished by using a resilient element that centers the slidable stop member with respect to the synchronizer ring after synchronization is established.

A further object of this invention is to prevent the blocking of the shift.

A still further object of this invention is to reduce the effort required for shifting from one speed ratio to another.

Further objects and features of this invention will become more apparent from the following description when read in conjunction with the accompanying drawings, wherein.

Figure 1:
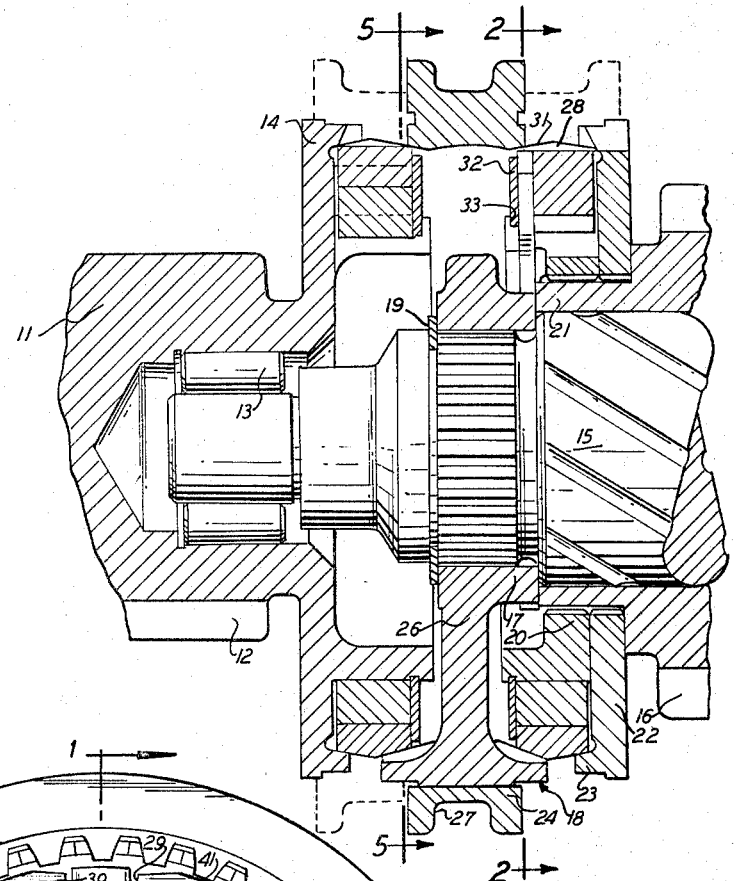
FIGURE 1 is a cross-sectional view of the synchronizer clutch construction, taken along the plane of section line 1—1 of FIGURE 2, embodying the present invention.

In FIGURE 1, numeral 11 identifies a portion of the power input shaft of a conventional transmission mechanism. A power input gear 12, which is integrally formed with the power input shaft 11, is counterbored to receive a pilot bearing 13. The gear 12 is formed with a clutch element having external clutch teeth 14. A reduced diameter portion of an intermediate shaft 15 is journaled in the bearing 13. A power output shaft (not shown) is coaxially aligned with and connected to the intermediate shaft 15.

Figure 5:
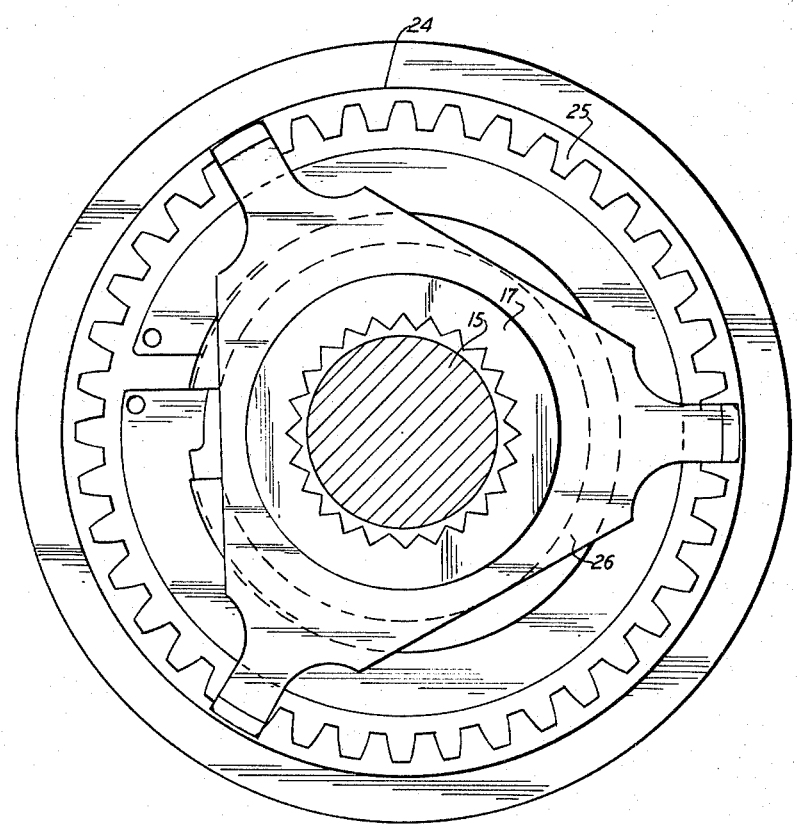
FIGURE 5 is an end view of the structure of FIGURES 1 and 2.

A gear 16 is journaled rotatably on the shaft 15 and is held axially fast by a split retainer ring on one side (not shown) and a hub 17 of a synchronizer clutch assembly generally designated as 18. The hub 17 is retained on the shaft 15 by a snap ring 19. The gear 16 has an externally splined extension 21 on which a clutch teeth element 22, having clutch 23, is splined. A clutch ring 20 also is splined internally to extension 21 adjacent element 22. An axially slidable sleeve 24 mounted on the hub 17 is formed with internal teeth 25 that selectively engage teeth 14 or 23 depending upon the direction in which the sleeve 24 is shifted. The hub 17 has three web portions 26, as best seen in FIGURE 5, to provide support for and guide the sleeve 24 during axial shifting movement. This shifting is accomplished by a shifter fork (not shown) which is received within a cooperating groove 27 formed in the sleeve 24.

Figure 2:
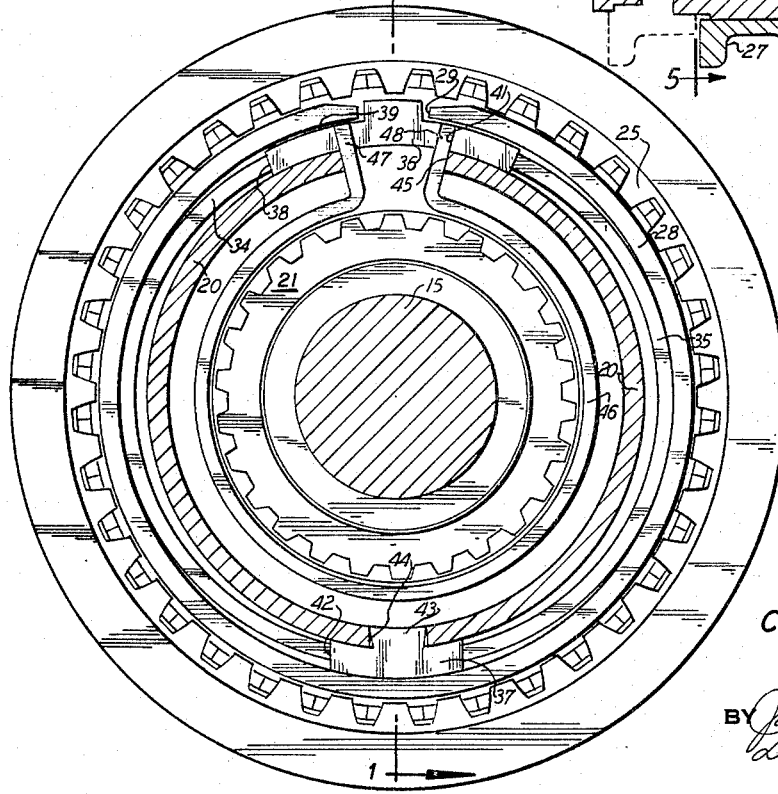
FIGURE 2 is a transverse cross-sectional view taken along line 2—2 of FIGURE 1.
Figure 3:
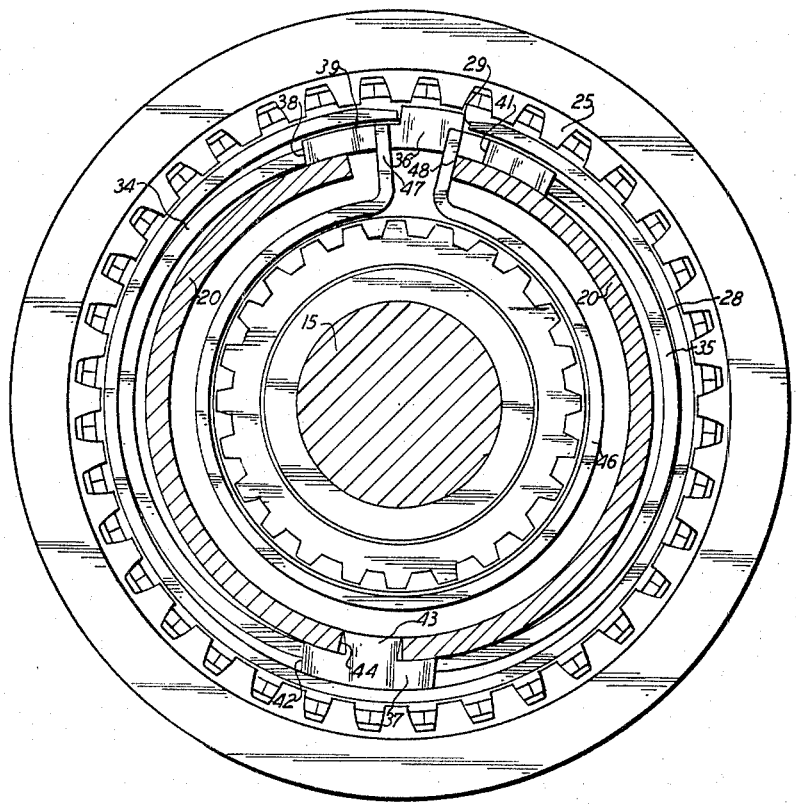
FIGURE 3 is a transverse cross-sectional view, similar to the view of FIGURE 2, showing the clutch elements in a relatively displaced position.

As best seen in FIGURES 2 and 3, the synchronizer clutch assembly 18 includes a split synchronizer ring 28 which is formed with a gap 29. The synchronizer ring 28 has tapered friction surfaces 31 on its outer periphery. A snap ring 32, best seen in FIGURE 1, is positioned in a groove 33. This ring and the clutch element 22 hold the synchronizer ring 28 against longitudinal displacement.

Oppositely arranged, resilient, locking bands 34 and 35 are mounted in the annular space between the extension 21 and the synchronizer ring 28 as seen in FIGURE 2. The ends of the locking bands 34 and 35 bear on oppositely disposed stop members 36 and 37. Stop member 36 has an arcuate body 38 that has a centrally disposed lug that extends into the gap 29 of the synchronizer 28.

Figure 4:
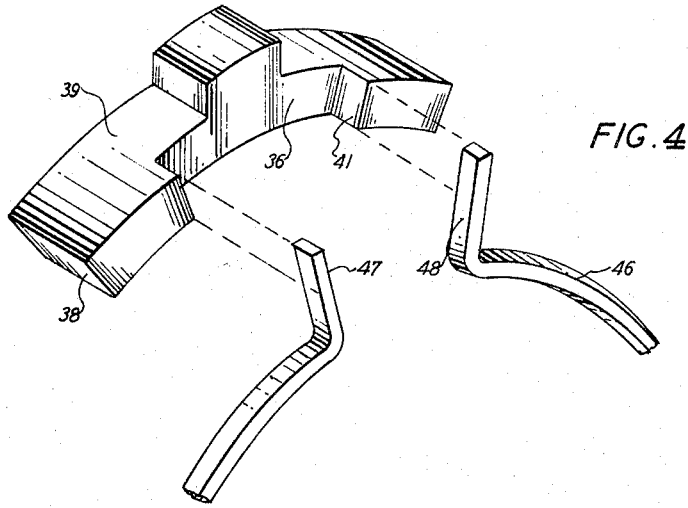
FIGURE 4 is an enlarged perspective view of one stop member and a portion of the resilient spring means acting on the stop member incorporated in the synchronizer clutch mechanism of this invention.

As can be readily seen, the stop member 36 is slidably mounted with respect to the clutch element 20. The arcuate body 38 has a curvature 39 at its outer surface that is substantially equal to the curvautre of the inner surface of the synchronizer ring 28. A recess or slot 41 is cut into one side of the stop member 36 at its center as best seen in FIGURE 4.

The second stop member 37 also has an arcuate body 42 that is disposed between the clutch element 20 and the synchronizer ring 28. A lug 43 having tapered sides extends from the body 42 into a slot 44 in the end of element 20. A second slot 45 is machined into the clutch element 22 on the side opposite the slot 44. The second slot has the same radial width as the recess cut into the first stop member 36.

The ends of the locking bands 34 and 35 bear on each of the stop members 36 and 37. Both locking bands 34 and 35 are of the same length and of the same arcuate shape, but the centers of curvature of the bands do not coincide with the axis of rotation of the synchronizer ring 28.

A split annular centering spring 46 encircles the hub 17. The ends of the centering spring 46 are bent radially outwardly to define a pair of prongs 47 and 48 as best seen in FIGURE 3. The prongs 47 and 48 extend radially outwardly through the slot 45 into the recess 41 in contact with the end faces of the slot 45 and the recess 41.

When the sleeve 24 is pushed to the right, the synchronizer ring 28 is shifted in a clockwise direction. The sleeve 24 is rotated by the shaft 15 as the stop member 36 engages one of the ends of either locking band.

When changing gears, the sleeve 24 is pushed either to the right or to the left depending on which gear is to be engaged. This causes the internal teeth 25 of the sleeve 24 to come into frictional engagement with the peripheral surface of the synchronizing ring 28. This causes the synchronizing ring 28 to be driven around by the sleeve 24, which is being rotated by the shaft 15, until one of the ends of the ring 28 encounter either one side or the other of the stop member 36. This causes the stop member 36 to be slidably moved into engagement with the adjacent end of the locking band 35 as best seen in FIGURE 3. The rotational movement of the synchronizer ring 28 applies a tangential force to the locking band 34 through stop member 36, but relative movement of the band 34 is prevented by stop member 37 which is firmly held in clutch element 20. The tangential force is then transferred through the stop member 37 to the clutch element 22 which, in turn, is positively connected to the gear 16. This tangential force is applied wherever relative motion between the shaft 15 and gear 16 takes place. Deceleration of the gear 16 will be effected until the speed of the gear 16 is in synchronization with the speed of the shaft 15, at which time the sleeve 24 can be fully shifted to the position shown in dotted lines in FIGURE 1.

During the shift interval, the tangential forces acting on the locking band 34 cause it to deflect and to force the outer surface thereof against the inner surface of the synchronizer ring 28 as seen in FIGURE 3. Forces applied in this manner oppose the gear changing force applied to the shifting of the sleeve 24 so that the shifting of the gear cannot be completed until synchronization is established.

When no relative rotation between the sleeve 24 and the synchronizing ring 28 is effected, synchronization is completed. This causes the locking band 34 to relax and servo action ceases so that the sleeve 24 can be pushed over the synchronizing ring 28 and its teeth 25 brought into mesh with the clutch teeth of the clutch element 22 to complete the gear change operation.

It can be readily understood that the teeth can be also shifted to the left in which case the synchronizer ring 28 is rotated in an opposite direction to drive the stop member 36 into engagement with the locking band 35.

During the synchronization operation, the prong 47 will move clockwise with the stop member 36 as it is in engagement with the side defining the recess 41 thereof. The other prong 48 will prevent rotation of the spring 46 as it remains in abutment wtih the right edge of the slot 44 cut into the clutch element 20. After synchronization is achieved, displaced stop member 36 is returned to its center position, as seen in FIGURE 2, by the spring action of the prong 47 to prevent the servo components from remaining in the blocking position after synchronization.

It can be readily understood that the centering spring 46 will avoid full or partial blocking of the shifting of the sleeve 24 to reduce the effort required in shifting.

I claim:

1. In a synchronizer clutch assembly adapted to form a releasable driving connection between coaxial driving and driven members, a first clutch element having first clutch teeth carried by one of said members, a second clutch element having second clutch teeth carried by the other of said members, a split synchronizer ring disposed adjacent said first clutch element and having formed thereon a first friction surface, said second clutch element having a second friction surface thereon and being movable in the direction of the axis of said driving and driven members so that said first and second friction surfaces engage each other when said second clutch element is moved toward said first clutch element as one clutch element rotates with respect to the other whereby tangential friction forces are transmitted to said synchronizer ring, a first stop having portions thereof located between the ends of said synchronizer ring, a clearance between the ends of said synchronizer ring and said first stop to permit shifting movement of said first stop in a tangential direction, a second stop connected to said first clutch element, locking means for transferring frictional forces to said first clutch element including resilient force transmitting portions located within said synchronizer ring and between said first and second stops, said force transmitting portions partially surrounding the axis of said driving and driven members whereby the friction forces acting upon said ring are transmitted to one said member to establish synchronism between said members as said first and second clutch teeth engage each other, and spring means carried by first clutch element for permitting limited movement of said first stop with respect to said second clutch element before synchronism between said first and second clutch elements is established and restoring said first stop to its original position with respect to said first clutch element after synchronism is established.

2. In a synchronizer clutch assembly adapted to form a releasable driving connection between coaxial driving and driven members, a first clutch element having first clutch teeth carried by one of said members, a second clutch element having second clutch teeth carried by the other said members, a split synchronizer ring disposed adjacent said first clutch element, said second clutch teeth being movable axially into frictional engagement with said synchronizer ring when the latter is moved toward said second clutch element whereby tangential frictional forces are transmitted thereto prior to engagement of said first and second clutch teeth, a slidable stop member having portions located between the ends of said synchronizer ring, means for transferring said frictional forces to said second clutch element upon sliding movement of said stop member, said means including at least one resilient, arcuate-shaped, locking member disposed within said synchronizer ring and in engagement with said stop member whereby the tangential frictional forces acting upon said synchronizer ring are transmitted to said one member to establish synchronism between said members prior to engagement of said clutch teeth, and resilient means engaging said stop member and said second clutch element and yieldable circumferentially to allow sliding movement of said stop member during the establishment of synchronism and restoration of said stop member to its original position with respect to said second clutch element after synchronism between said members is established.

3. In a synchronizer clutch assembly adapted to form a releasable driving connection between driving and driven members, a first clutch element carried by one of said members and having formed thereon external clutch teeth, a second clutch element connected to the other of said members and having formed thereon internal clutch teeth, a split synchronizer ring mounted adjacent said first clutch element and having an external peripheral friction surface, said second clutch element being axially movable into clutching engagement with said first clutch element, said second clutch element having an internal friction surface engageable with said external friction surface of said synchronizer ring when it is moved towards said first clutch element whereby tangential frictional forces are transmitted to said synchronizer ring, a slidable first stop member disposed within said synchronizer ring with portions thereof received between the ends of said synchronizer ring, a second stop member remote from said first stop member and having portions thereof connected to said first clutch element, a pair of arcuate locking members, each locking member respectively acting on the inner peripheral surface of the synchronizer ring in each of its working directions as synchronism is established, one end of each locking member being adjacent said second stop member, said first stop member being slidable upon rotation of said synchronizer ring in one direction to cause said first stop member to shift into engagement with one or the other end of one of said pair of locking members in the direction of rotation of said synchronizer ring whereby the forces acting upon said ring are transmitted to said one member through said second stop member and said second clutch element to establish synchronism between said members prior to engagement of said clutch teeth, and an annular split-spring disposed adjacent to and in a non-rotatable relationship with respect to said first clutch element, said split-spring having ends engaging said first clutch element and said first stop member, said split-spring yielding circumferentially during sliding movement of said first stop member to permit movement thereof with respect to said first clutch element until synchronism is established but restoring said first stop member to its original position with respect to said first clutch element after synchronism is accomplished.

4. The synchronizer clutch assembly as claimed in claim 3 and which is further characterized in that said first clutch element has a gap and said split-spring is an annular resilient spring with its ends extending radially outwardly through said gap of said first clutch element and into abutment with portions of said first stop member.

5. The synchronizer clutch assembly as claimed in claim 4 and which is further characterized in that said first stop member is provided with a centrally disposed recess, said split-spring having ends received within said recess, one of said ends remaining in abutment with said second clutch element as the other end is movable in the direction of movement of said first stop member.

References Cited
UNITED STATES PATENTS

| | | | |
|---|---|---|---|
| 2,788,874 | 4/1957 | Forster | 74—339 |
| 2,932,373 | 4/1960 | Schmid | 192—53.1 |

BENJAMIN W. WYCHE III, *Primary Examiner.*

MARK M. NEWMAN, *Examiner.*

L. J. PAYNE, *Assistant Examiner.*